United States Patent [19]

Kawai

[11] Patent Number: 4,597,588
[45] Date of Patent: Jul. 1, 1986

[54] DEVICE FOR ADJUSTING WEBBING-SUPPORTING POSITION

[75] Inventor: Osamu Kawai, Fujisawa, Japan

[73] Assignee: NSK-Warner K.K., Japan

[21] Appl. No.: 648,322

[22] Filed: Sep. 7, 1984

[30] Foreign Application Priority Data

Sep. 7, 1983 [JP] Japan .............................. 58-137755[U]

[51] Int. Cl.⁴ ............................................. B60R 22/00
[52] U.S. Cl. ..................... 280/808; 280/804; 297/473
[58] Field of Search ......................... 280/801, 804, 808; 297/468, 473

[56] References Cited

U.S. PATENT DOCUMENTS 4,398,749  8/1983  Hipp et al. ........................... 280/801
4,398,751  8/1983  Wahlmann et al. ................. 280/808
4,460,198  7/1984  Sasase et al. ......................... 280/804

FOREIGN PATENT DOCUMENTS

3012754A1  10/1981  Fed. Rep. of Germany .
2075821A   11/1981  United Kingdom .

Primary Examiner—John J. Love
Assistant Examiner—Kenneth R. Rice
Attorney, Agent, or Firm—Wegner & Bretschneider

[57] ABSTRACT

Disclosed herein is a device suitable for use in adjusting the supporting position of a webbing of a vehicle seat belt system. When a force is applied to an adjustable anchor, the force is received by a substantially, turned, square U-shaped face so as to permit reception of significantly large forces without need for enlarging the device.

13 Claims, 16 Drawing Figures

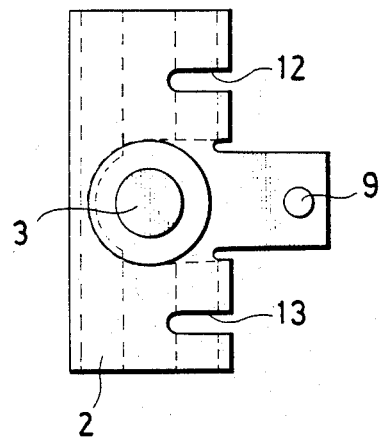
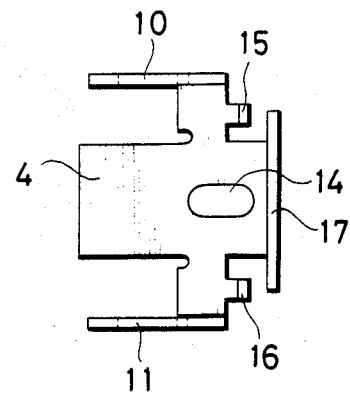
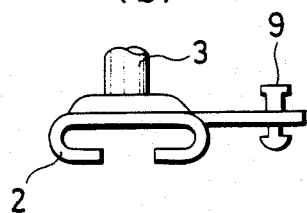
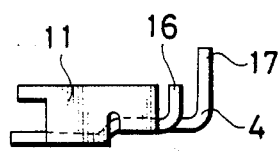
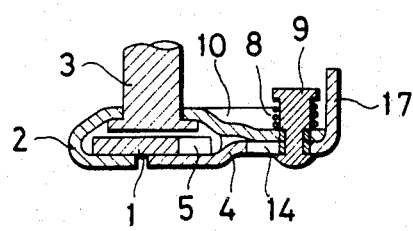
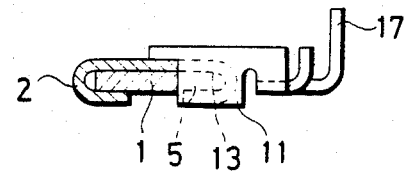
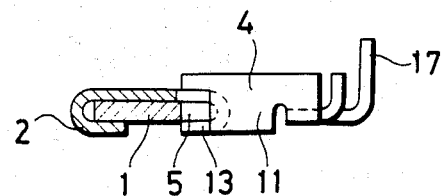

DEVICE FOR ADJUSTING WEBBING-SUPPORTING POSITION

BACKGROUND OF THE INVENTION (1) Field of the Invention:

This invention relates to a device for adjusting the position of an anchor, the latch of a movable anchor, through-anchor, retractor or similar means used in an occupant-restraining seat belt system.

(2) Description of the Prior Art:

Some proposals have hitherto been made on position-adjusting devices of the above sort in order to achieve webbing arrangements suitable for the physical constitutions of individual seat belt users, as disclosed for example in U.S. Pat. No. 4,398,751 issued Aug. 16, 1983 to Ernst Wahlmann et al, German Offenlegungsschrift No. 30 12 754 laid open on Oct. 8, 1981 and naming Keiper Automobiltechnik GmbH & Co KG. as an applicant, and U.K. Patent Application No. 2,075,821 laid open on Nov. 25, 1981 and naming Brose-Verwaltungsgesellshaft GmbH as an applicant. However, there appears to be still some room for improvement to their durability in view of faces which bear large forces when the large forces are applied respectively to adjustable anchors, which are guided along their corresponding bases, in directions of adjustment of the adjustable anchors.

SUMMARY OF THE INVENTION

With the foregoing in view, an object of this invention is to provide a device suitable for use in adjusting the supporting position of a webbing of a vehicle seat belt system, in which when a force is applied to an adjustable anchor, the force is received by a substantially, turned, square U-shaped face so as to permit reception of significantly large forces without need for enlarging the device.

In one aspect of this invention, there is thus provided a device suitable for use in adjusting the supporting position of a webbing of a vehicle seat belt system, said device including a base having a plurality of latch portions, an adjustable anchor guided along the base, a latch member mounted on the adjustable anchor displaceably between an engagement position where the the latch member is in engagement with either one of the latch portions so as to fix the adjustable anchor on the base and a non-engagement position where the latch member is kept out of engagement with any one of the latch portions so as to permit movement of the adjustable anchor along the base, and manipulating means for bringing the latch member from the engagement position to the non-engagement position, wherein at least one of the adjustable anchor and base has a substantially, turned, square U-shaped face in a direction perpendicular to the direction in which the adjustable anchor is guided and the latch member has a face engageable with the substantially, turned, square U-shaped face at the engagement position.

In another aspect of this invention, there is also provided a device suitable for use in adjusting the supporting position of a webbing of a vehicle seat belt system, said device including a base having a plurality of latch portions, an adjustable anchor guided along the base, a latch member mounted on the adjustable anchor displaceably between an engagement position where the the latch member is in engagement with either one of the latch portions so as to fix the adjustable anchor on the base and a non-engagement position where the latch member is kept out of engagement with any one of the latch portions so as to permit movement of the adjustable anchor along the base, manipulating means for bringing the latch member from the engagement position to the non-engagement position, a rail mounted on a vehicle body, a movable anchor displaceable along the rail, a drive member for driving the movable anchor, and a latch lever attached to the adjustable anchor and engageable with the movable anchor, wherein at least one of the adjustable anchor and base has a substantially, turned, square U-shaped face in a direction perpendicular to the direction in which the adjustable anchor is guided and the latch member has a face engageable with the substantially, turned, square U-shaped face at the engagement position.

The present invention can therefore provide devices, each suitable for use in adjusting the supporting position of a webbing of a vehicle seat belt system along a base mounted for example on a vehicle body while enjoying sufficient durability against components of forces applied to an adjustable anchor which components are exerted in the direction of adjustment of the adjustable anchor, because the components are borne by a substantially, turned, square U-shaped face formed in at least one of the adjustable anchor and the base.

The above and other objects, features and advantages of the present invention will become apparent from the following description and the appended claims, taken in conjuction with the accompanying drawings.

BRIEF DESCRIPTION OF THE DRAWINGS

In the accompanying drawings:

FIG. 2(a) is a plan view of an adjustable anchor incorporated in the device;

FIG. 2(b) is a front view of the adjustable anchor;

FIG. 3(a) is a plan view of a latch member incorporated in the device;

FIG. 3(b) is a front view of the latch member;

FIG. 4 is a cross-sectional view taken along line IV—IV of FIG. 1;

FIG. 5 is a cross-sectional view taken along line V—V of FIG. 1;

FIG. 6 is a cross-sectional view similar to FIG. 5 except that the adjustable anchor is out of engagement with its matching base;

DETAILED DESCRIPTION OF THE INVENTION AND PREFERRED EMBODIMENTS

Figure 1:
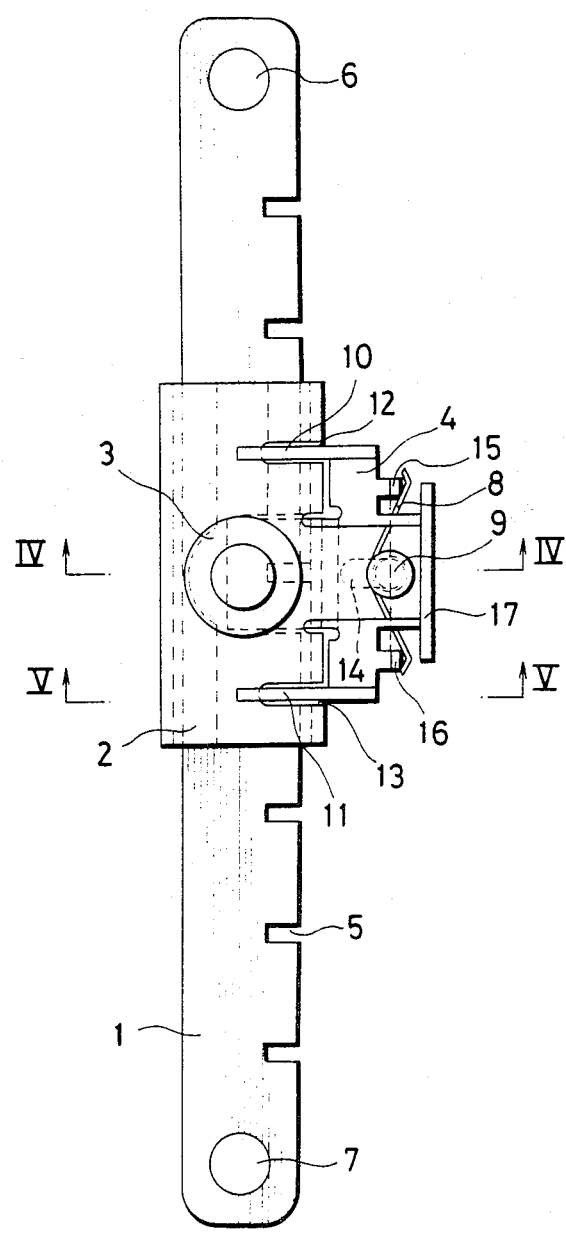
FIG. 1 is a plan view of a device according to the first embodiment of this invention.

Referring first to FIG. 1, an adjustable anchor 1 is provided slidably along a base 1 which serves as a guide member. Provided in turn with the adjustable anchor 1 are an anchor member 3 and a latch member 4 for selectively fixing the adjustable anchor 2 on the base 1 or allowing the adjustable anchor 2 to move relative to the base 1. The base 1 defines a plurality of notches 5 spacedly along the length thereof. Bolts (not shown) are caused to extend respectively through two bolt holes 6,7, whereby fixedly mounting the base 1 for example on a center pillar of a vehicle.

The adjustable anchor 2 has a C-shaped cross-section as illustrated in FIG. 2(b), on which there are provided the latch member 4 and a pin 9 adapted to attach a spring 8 for biasing the latch member 4 toward its engagement position (i.e., in the leftward direction in FIG. 1). In addition, the adjustable anchor 2 defines interlocking parts 12,13 for guiding interlocking pieces 10,11 of the latch member 4 into engagement therewith. Namely, each of the interlocking parts 12,13 is thus defined by a pair of substantially, turned, square U-shaped faces which sandwich the corresponding one of the interlocking pieces 10,11 therebetween and extend at right angles to the direction of adjustment of the adjustable anchor 2.

The latch member 4 is provided, as depicted in FIG. 3(a), with the pair of interlocking pieces 10,11. Besides, the latch member has a slot 14 for receiving the pin 9 fittingly, a pair of lugs 15,16 for engagement with the legs of the spring 8 adapted to bias the latch member 4, and a knob 17 on which a force is exerted when pulling the latch member 4 toward its non-engagement position (i.e., in the rightward direction as seen in FIG. 1) against the force of the spring 8.

In FIG. 4 which is a cross-sectional view taken along line IV—IV of FIG. 1, there are shown the adjustable anchor 2 and latch member 4 in an assembled form.

The operation of the device according to the first embodiment of this invention will next be described. In a state depicted in FIG. 1 and FIG. 5 which is a cross-sectional view taken along line V—V of FIG. 1, the interlocking pieces 10,11 of the latch member 4 are kept in engagement with desired notches 5 of the base 1 and the upper and lower faces of the interlocking pieces 10,11 are kept respectively in contact with the turned, square U-shaped faces of their corresponding interlocking parts 12,13 of the adjustable anchor 2. Accordingly, the adjustable anchor 2, namely, the anchor member 3 is fixed at the illustrated position so that the shoulder webbing, which extends for example through a through-ring secured on the anchor member 3, is allowed to fit the physical constitution of the occupant and comfortable fastening of the seat belt system is hence assured. When a force is applied to the shoulder webbing in the above state and the force is then transmitted to the adjustable anchor 2 by way of the anchor member 3. Force components other than those exerted along the length of the base 1 are borne by portions of the base 1 which portions are in abutment with illustrated U-shaped grooves of the adjustable anchor 2, and force components exerted along the length of the base 1 are received by the interlocking pieces 10,11 of the latch member 4 which interlocking pieces 10,11 are in contact with the turned, square U-shaped faces of the interlocking parts 12,13. Since lengthwise force components are received by the turned, square U-shaped faces as mentioned above, the above device can withstand large forces.

When the occupant wants to adjust the position of the adjustable anchor 2, he is required to put his hand on the knob 17 of the latch member 4 and then to pull the latch member 4 against the force of the spring 8 in the rightward direction as seen in FIG. 1. As illustrated in FIG. 6 which is similar to FIG. 5 except that the latch member 4 is out of engagement with the base 1, the interlocking pieces 10,11 of the latch member 4 are caused to retreat from the desired notches 5 of the base 1 and the adjustable anchor 2 has thus been rendered movable along the base 1 for adjustment of its position. When the adjustable anchor 2 has been shifted to a new position where it is engageable with the base 1, the latch member 4 is again brought into the engagement position owing to the force of the spring 8. At the new position, the latch member 4 is hence brought into the same state as that depicted in FIGS. 1 and 5.

Let's now suppose that in the first embodiment, the base is mounted in the state depicted in FIG. 1 on a center pillar of a vehicle. Then, the latch member 4 is allowed to slide horizontally in a direction perpendicular to the widthwise direction of the vehicle so as to assume either engagement position or non-engagement position. As illustrated in FIGS. 1 through 6, it is advantageous from the viewpoint of layout upon mounting the device on a vehicle to allow the latch member 4 to move in the direction perpendicular to the widthwise direction of the vehicle because the lateral projection of the position-adjusting device into the interior of the vehicle can be minimized. It is also advantageous to choose the non-engagement position in a direction opposite to the advancing direction of the vehicle (supposing that the front part of the vehicle is located in the leftward direction as seen in FIG. 1), since the latch member 4, namely, the interlocking pieces 10,11 are not released in most instances from their engagement positions due to sudden speed decelerations of the vehicle.

Furthermore, the base 1 which is mounted on the vehicle body is made of a single piece of strip. Therefore, it is possible to bend the base 1 with a curvature which conforms with the curvature of the vehicle body, whereby to shift the adjustable anchor 2 along the vehicle body. This arrangement permit a further reduction to the lateral projection of the position-adjusting device into the interior of the vehicle.

Figure 7:
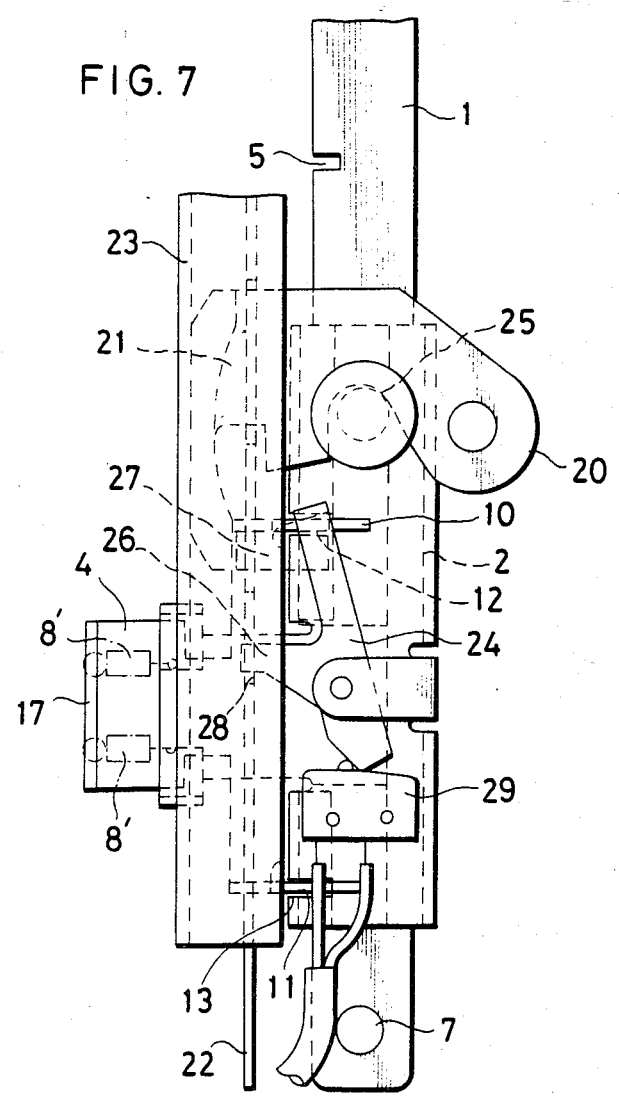
FIG. 7 is a plan view of a modification of the first embodiment.
Figure 8:
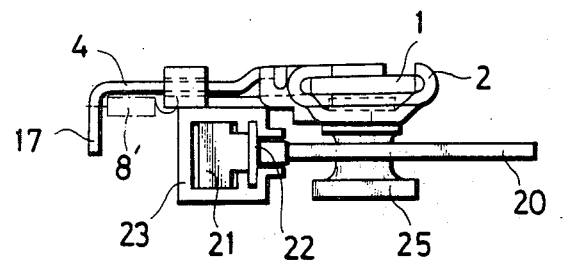
FIG. 8 is a rear view of the modification.

A modification of the above-described first embodiment of this invention will next be described. In this modification, it is not the anchor member 3 but a latch of a movable anchor 20 that is provided with the adjustable anchor 2. In FIGS. 7 and 8, the same or equivalent elements of structure as or to those of the first embodiments are designated by the same reference numerals and their description will thus be omitted whenever readily understandable from the above description of the first embodiment.

The movable anchor 20 is integral with a slider 21 which is attached loosely to a drive member 22. The slider 21 thus caused to move along a rail 23 mounted on the vehicle body so that the movable anchor 20 is rendered displaceable between the occupant-restraining position and the occupant-releasing position. The adjustable anchor 2 carrying the latch provided therewith is disposed at the occupant-restraining position in such a way that its position is adjustable along the base 1.

A latch lever 24 is provided with the adjustable anchor 2 swingably between an engagement position and a non-engagement position and a protrusion 25 is also fixed on the adjustable anchor 2. When the movable anchor 20 is moved toward the occupant-restraining position by means of the drive member 22, a hook 27 which extends out from the slider 21 is shifted to the position shown in FIG. 7 and at the same time, a recess of the movable anchor 20 and the protrusion 25 are brought into contact because the drive member 22 is kept in contact with a projection 26 of the latch lever 24 and the latch lever 24 is at its non-engagement position. Since the projection 26 of the latch member 24 is at the same time caused to fall into a hole 28 formed through the drive member 22, the latch lever 24 is shifted to its engagement position owing to the force of an unillustrated spring and the latch lever 24 is hence brought into engagement with the hook 27 to latch the movable anchor 20 at a suitably-adjusted occupant-restraining position as shown in FIG. 7. The latch lever 24 also actuates a limit switch 29 so as to stop an unillustrated motor which serves to drive the drive member 22.

When the occupant wants to shift the movable anchor 20 to the occupant-releasing position, it is necessary to perform the above operation backward. The drive member 22 is first of all caused to move, thereby releasing the projection 26 of the latch lever 24 from the hole 28 and hence bringing the latch lever 24 to the non-engagement position against the biasing force of the unillustrated spring. Here, the slider 21 and movable anchor 20 are started moving by the drive member 22. Since the latch lever 24 is no longer in engagement with the hook 27, the slider 21 and movable anchor 20 are allowed to start smooth movement.

The above modification can also bring about the same advantageous effects as the first embodiment. It is also possible to shift the adjustable anchor by bending the base with the same curvature as that of the rail 23 which is bent along the curvature of the vehicle body.

Figure 11:
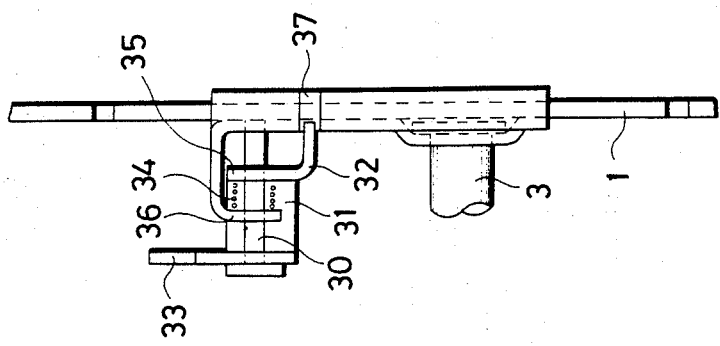
FIGS. 10 and 11 are side views of the device of FIG. 9, illustrating the operation of the device.
Figure 10:
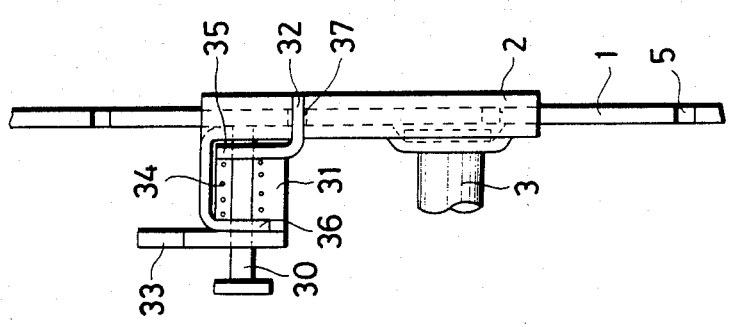
Figure 9:
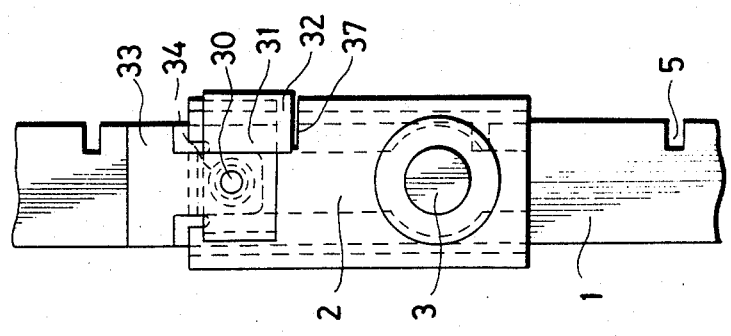
FIG. 9 is a plan view of a device according to the second embodiment of this invention.

In the first embodiment, the latch member 4, namely, the interlocking pieces 10,11 are allowed to move in directions parallel to the plane of the base 1. With reference to FIGS. 9 through 11, there will be described the second embodiment of this invention in which the latch member is movable in directions extending through the base. The same elements of structure as those of the first embodiment will be identified by the same reference numerals and their description will thus be omitted.

The adjustable anchor 2 is fixedly provided with a headed pin 30 which extend at a right angle relative to the base 1. A latch member 31 is provided displaceably along the headed pin 30. The latch member 31 has an interlocking piece 32, a knob 33, and a portion 35 adapted to support one end of a spring 34. The other end of the spring 34 is in contact with a portion 36 extending from the adjustable anchor 2. The spring 34 thus urges the latch member 31 toward an engagement position (i.e., the rightward direction in FIG. 10).

In the state illustrated in FIGS. 9 and 10, the interlocking piece 32 is kept in engagement with desired one of the notches 5 and at the same time, is sandwiched between a pair of turned, square U-shaped faces of an interlocking part 37 of the adjustable anchor 2. The turned, square U-shaped faces extend at right angles relative to the longitudinal axis of the base 1. When the occupant wants to adjust the position of the anchor member 3, it is necessary for him to put his hand on the knob 33 and then to pull the latch member 31 against the force of the spring 34 in the leftward direction as shown in FIG. 11. The other operation is the same as in the first embodiment.

In the second embodiment, the base 1 may be fixedly mounted on a centerpillar of a vehicle in the same state as in FIG. 9 so that the latch member 31 may be displaced at a right angle relative to the direction of adjustment of the adjustable anchor 2 and along the widthwise direction of the vehicle.

Figure 12:
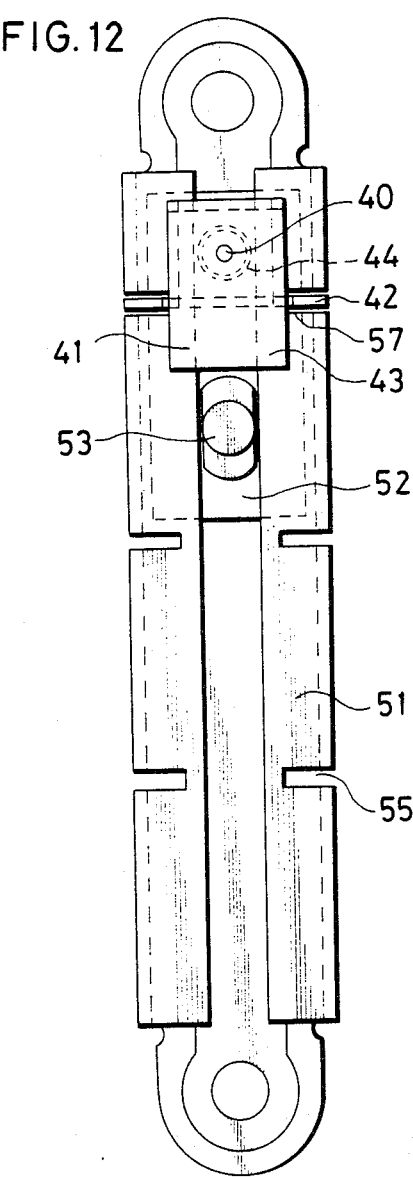
FIG. 12 is a plan view of a device according to the third embodiment of this invention.
Figure 13:
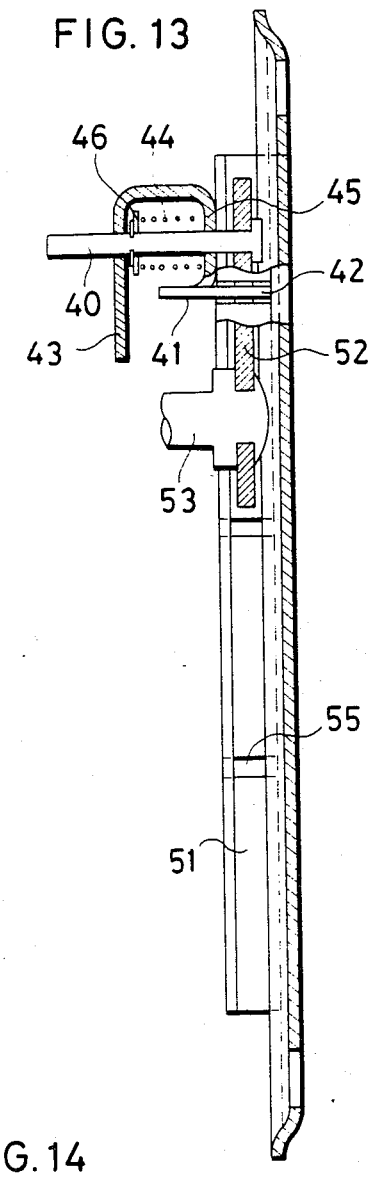
FIG. 13 is a side view of the device of FIG. 12.
Figure 14:
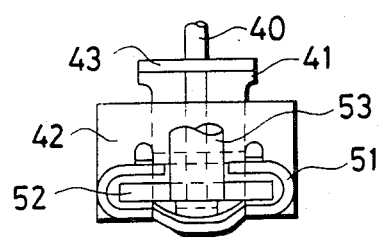
FIG. 14 is a front view of the device of FIG. 12.

Reference will next be made to FIGS. 12 through 14 in which there is illustrated the third embodiment of this invention. The third embodiment is of the same type as the second embodiment except that substantially, turned, square U-shaped faces are formed in the base.

A base 51 has a C-shaped cross-section and defines a plurality of paired notches 55. Each of the paired notches 55 is defined by a pair of mutually-opposing and substantially, turned, square U-shaped faces which extend at right angles relative to the direction of adjustment of the adjustable anchor 52.

An anchor member 53 and pin 40 are fixedly attached to the adjustable anchor 52. The pin 40 extends at a right angle relative to the adjustable anchor 52. A latch member 41 is provided displaceably along the pin 40. The latch member 41 has an interlocking piece 42, a knob 43 and a portion 45 adapted to support one end of a spring 44. The other end of the spring 44 is kept in contact with a flange 46 provided fixedly on the pin 40. Therefore, the spring 44 urges the latch member 41 toward an engagement position (namely, in the rightward direction as seen in FIG. 13 which shows the side view of the device or in the downward direction as seen in FIG. 14 which illustrates the front view of the device).

The operation of the third embodiment is substantially the same as that of the second embodiment.

Having now fully described the invention, it will be apparent to one of ordinary skill in the art that many changes and modifications can be made thereto without departing from the spirit or scope of the invention as set forth herein.

What is claimed is:

1. In a device suitable for use in adjusting the supporting position of a webbing of a vehicle seat belt system, said device including a base having a plurality of latch portions, an adjustable anchor guided along a base, a latch member mounted on the adjustable anchor displaceably between an engagement position where the latch member is in engagement with any one of the latch portions so as to fix the adjustable anchor on the base and a non-engagement position where the latch member is kept out of engagement with any of the latch portions so as to permit movement of the adjustable anchor along the base, and manipulating means for bringing the latch member from the engagement position to the non-engagement position, the improvement wherein the adjustable anchor defines an inwardly-notched interlocking portion, the interlocking portion contains a substantially, turned, square U-shaped face extending at a right angle to the direction in which the adjustable anchor is guided, the latch member has a face engageable with the turned, square U-shaped face at the engagement position with the latter face being covered by the former face, and the latch portions of the base are received withing the turned, square U-shaped face when viewed in the direction in which the anchor is guided.

2. A device as claimed in claim 1, wherein the adjustable anchor defines an interlocking part adapted to guide the latch member into engagement therewith, the interlocking part in turn defines a pair of mutually-opposing and substantially, turned, square U-shaped faces with the latch member interposed therebetween, and the pair of mutually-opposing faces extend at right angles to the direction of adjustment of the adjustable anchor.

3. A device as claimed in claim 1, wherein the base is planar and defines the latch portions in a side edge thereof.

4. A device as claimed in claim 1, including means for guiding the latch member in a direction transverse to the base.

5. A device as claimed in claim 1, including means for guiding the latch member in a direction extending through the base.

6. A device as claimed in claim 4, wherein the latch portion is formed of a pair of mutually-opposing and substantially, turned, square U-shaped faces capable of sandwiching the latch member therebetween and extending at right angles to the direction of adjustment of the adjustable anchor.

7. In a device suitable for use in adjusting the supporting position of a webbing of a vehicle seat belt system, said device including a base having a plurality of latch portions, an adjustable anchor guided along the base, a latch member mounted on the adjustable anchor displaceably between an engagement position where the latch member is in engagement with any one of the latch portions so as to fix the adjustable anchor on the base and a non-engagement position where the latch member is kept out of engagement with any of the latch portions so as to permit movement of the adjustable anchor along the base, and manipulating means for bringing the latch member from the engagement position to the non-engagement position, the improvement wherein the adjustable anchor defines an interlocking portion adapted to be brought into engagement with the latch member, the latch portions of the base are formed as inwardly-extending notches and contains substantially, turned, square U-shaped faces extending at right angles to a direction in which the adjustable anchor is guided, the latch member has a face engageable with any of the turned, square U-shaped faces at the engagement position with the latter face being covered by the former face, and the interlocking portion of the adjustable anchor is received within the substantially, turned, square U-shaped faces when viewed in the direction in which the anchor is guided.

8. A device as claimed in claim 7, wherein the base has a substantially C-shaped cross-section and is provided surrounding the adjustable anchor.

9. A device as claimed in claim 7, wherein the latch portions are formed in pairs in both side edges of the base.

10. In a device suitable for use in adjusting the supporting position of a webbing of a vehicle seat belt system, said device including a base having a plurality of latch portions, an adjustable anchor guided along the base, a latch member mounted on the adjustable anchor displaceably between an engagement position where the the latch member is in engagement with any one of the latch portions so as to fix the adjustable anchor on the base and a non-engagement position where the latch member is kept out of engagement with any of the latch portions so as to permit movement of the adjustable anchor along the base, manipulating means for bringing the latch member from the engagement position to the non-engagement position, a rail to be mounted on a vehicle body, a movable anchor displaceable along the rail, a drive member for driving the movable anchor, and a latch lever attached to the adjustable anchor and engageable with the movable anchor, the improvement wherein at least one of the adjustable anchor and base has a substantially, turned, square U-shaped face in a direction perpendicular to the direction in which the adjustable anchor is guided and the latch member has a face engageable with the substantially, turned, square U-shaped face at the engagement position.

11. A device as claimed in claim 10, including means mounting the latch lever on the adjustable anchor in such a way that the latch lever is displaceable between an engagement position where the latch lever is engageable with the movable anchor and a non-engagement position where the latch lever is kept out of engagement with the movable anchor.

12. A device as claimed in claim 11, including a switch adapted to control actuation means for the drive member, which switch is turned on when the latch lever has been brought from the non-engagement position into the engagement position.

13. A device as claimed in claim 11, wherein the drive member defines a hole therethrough in order to control movements of the latch lever, and the latch lever assumes the engagement position when a portion of the latch lever is received in the hole and assumes the non-engagement position when the portion of the latch lever is outside the hole.

* * * * *